Patented Feb. 16, 1926.

1,573,169

UNITED STATES PATENT OFFICE.

EDWARD W. KEITH, OF DENVER, COLORADO, ASSIGNOR TO GENERAL METALS RECOVERY COMPANY, A CORPORATION OF COLORADO.

PROCESS OF PURIFYING GAS-HOUSE LIQUOR.

No Drawing. Application filed September 30, 1924. Serial No. 740,881.

*To all whom it may concern:*

Be it known that I, EDWARD W. KEITH, a citizen of the United States, residing in the city and county of Denver, State of Colorado, have invented new and useful Processes of Purifying Gas-House Liquor preparatory to its use as a solvent menstruum in the extraction and recovery of metals, metallic oxides, and mineral salts contained in ores and mineral-bearing products, of which the following are the specifications.

This invention relates to the hydrometallurgical process of extracting and recovering metals, metallic oxides and salts from ores and other metal bearing products wherein gas house liquor is the solvent menstruum and has in objective an increase in recovery of the metallic contents of the material treated.

Ammonium sulphide is contained in gas house liquor as produced, detracting from its perfection as a solvent of metals, metallic oxides and salts contained in ores. Contact of ammonium sulphide with metallic oxide, especially zinc oxide, frees or releases the ammonia, the sulphur radical reacting converts the metallic oxide to a sulphide which precipitates in or with the gangue of the ore or metal bearing product under treatment and is lost to recovery.

This loss is evaded by preliminarily treating the gas house liquor with the necessary amount of metallic oxide, preferably zinc oxide, to react with the ammonium sulphide contained, to thoroughly free or release this ammonia with the resulting precipitation of the metallic sulphide so formed. The gas house liquor is then filtered or decanted to separate and recover both the converted solid and the liquor in its desired purified condition for leaching application to the metal bearing ore or product contemplated in treatment. The precipitated metallic sulphide formed through the reaction described, on recovery by filtration or decantation, is calcined with the ore or product to be leached with the purified gas house liquor, or is separately oxidized by calcination to a condition suitable for re-use in the purification of fresh or unrefined gas house liquor as desired.

Having described my invention, what I claim as new, and desire to secure by Letters Patent is:

1. The process of purifying gas house liquor for hydrometallurgical use by charging this solvent menstruum with zinc oxide in amount sufficient to react on the ammonium sulphide contained, freeing the combined ammonia with the formation of zinc sulphide, separating the purified gas house liquor from the zinc sulphide so formed and recovering the liquor in its resulting condition substantially as described.

2. The process of removing the sulphides of gas house liquor by charging said liquor with such metallic oxides as will react with the ammonium sulphides present thus freeing the ammonia so combined with a resulting formation of insoluble metallic sulphides and separating such metallic sulphides from the liquor substantially as herein described.

EDWARD W. KEITH.